United States Patent
Liu et al.

(10) Patent No.: US 8,478,760 B2
(45) Date of Patent: Jul. 2, 2013

(54) TECHNIQUES OF EFFICIENT QUERY OVER TEXT, IMAGE, AUDIO, VIDEO AND OTHER DOMAIN SPECIFIC DATA IN XML USING XML TABLE INDEX WITH INTEGRATION OF TEXT INDEX AND OTHER DOMAIN SPECIFIC INDEXES

(75) Inventors: Zhen Hua Liu, San Mateo, CA (US); Muralidhar Krishnaprasad, Fremont, CA (US); Hui Joe Chang, Fremont, CA (US); Vikas Arora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1689 days.

(21) Appl. No.: 11/601,147

(22) Filed: Nov. 17, 2006

(65) Prior Publication Data

US 2008/0120322 A1    May 22, 2008

(51) Int. Cl.
*G06F 17/30*    (2006.01)

(52) U.S. Cl.
USPC .......................................................... 707/741

(58) Field of Classification Search
USPC ........................................ 707/2, 3, 104.1, 741
See application file for complete search history.

(56) References Cited

U.S. PATENT DOCUMENTS

| 5,546,576 | A | 8/1996 | Cochrane et al. |
|---|---|---|---|
| 6,366,934 | B1 | 4/2002 | Cheng et al. |
| 6,643,633 | B2 * | 11/2003 | Chau et al. ............... 707/1 |
| 6,654,734 | B1 * | 11/2003 | Mani et al. ............... 707/2 |
| 6,694,306 | B1 * | 2/2004 | Nishizawa et al. ....... 707/3 |
| 6,708,186 | B1 | 3/2004 | Claborn et al. |
| 6,915,304 | B2 | 7/2005 | Krupa |
| 6,925,470 | B1 | 8/2005 | Sangudi et al. |
| 7,124,144 | B2 | 10/2006 | Christianson et al. |
| 7,146,365 | B2 | 12/2006 | Allen et al. |
| 7,315,852 | B2 * | 1/2008 | Balmin et al. ............ 707/3 |
| 7,398,265 | B2 * | 7/2008 | Thusoo et al. ........... 707/2 |
| 7,657,549 | B2 | 2/2010 | Morris et al. |
| 2001/0037345 | A1 | 11/2001 | Kiernan et al. |
| 2002/0078068 | A1 | 6/2002 | Krishnaprasad et al. |
| 2003/0101169 | A1 | 5/2003 | Bhatt et al. |
| 2003/0140308 | A1 | 7/2003 | Murthy et al. |
| 2003/0177443 | A1 | 9/2003 | Schnelle et al. |

(Continued)

OTHER PUBLICATIONS

U.S. Appl. No. 11/394,878, filed Mar. 31, 2006, Non-Final Office Action, Correspondence Mailing Date: Feb. 20, 2009.*

(Continued)

*Primary Examiner* — Jorge A Casanova
(74) *Attorney, Agent, or Firm* — Hickman Palermo Truong Becker Bingham Wong LLP

(57) ABSTRACT

Commonly searched nodes of complex data types contained in a collection of XML documents can be projected to, and their values can be stored in, corresponding columns in XML Table Index tables in a database system. In one embodiment, those columns stores logical pointers, rather than raw values, of the complex data types. Domain indexes are further provided to index at least one of the columns of complex data types in XML Table Indexes. The inclusion of complex data types and domain indexes provide a more efficient mechanism for searching domain specific data, such as audio, video, text stored in the collection of XML documents. Query optimizer logic of the database system can prepare one or more query execution plans for a submitted query including a plan that leverages XML Table Indexes and domain indexes and select a query execution plan based on cost information.

38 Claims, 3 Drawing Sheets

U.S. PATENT DOCUMENTS

| | | | |
|---|---|---|---|
| 2003/0212664 | A1 | 11/2003 | Breining et al. |
| 2004/0034615 | A1 | 2/2004 | Thomson et al. |
| 2004/0163041 | A1 | 8/2004 | Engel |
| 2004/0167904 | A1 | 8/2004 | Wen et al. |
| 2004/0225724 | A1* | 11/2004 | Pavlik et al. ............... 709/219 |
| 2005/0091188 | A1 | 4/2005 | Pal et al. |
| 2005/0228792 | A1 | 10/2005 | Chandrasekaran et al. |
| 2006/0173865 | A1 | 8/2006 | Fong |
| 2006/0212420 | A1* | 9/2006 | Murthy ............................. 707/1 |
| 2007/0038649 | A1 | 2/2007 | Agrawal et al. |
| 2007/0239681 | A1 | 10/2007 | Krishnaprasad et al. |

OTHER PUBLICATIONS

U.S. Appl. No. 11/601,146, filed Nov. 17, 2006, Final Office Action, Correspondence Mailing Date: Mar. 3, 2009.*

U.S. Appl. No. 11/394,878, filed Mar. 31, 2006, Notice of Allowance, Correspondence Mailing Date: Aug. 20, 2009.*

U.S. Appl. No. 11/601,146, filed Nov. 17, 2006, Non-Final Office Action, Correspondence Mailing Date: Jul. 22, 2009.*

U.S. Appl. No. 11/728,650, filed Mar. 26, 2007, Office Action, Correspondence Mailing Date: Aug. 10, 2009.*

U.S. Appl. No. 11/601,146, filed Nov. 17, 2006, Final Office Action, Correspondence Mailing Date: Dec. 4, 2009.*

Priti, Patil et al., "Holistic Schema Mappings for XML-on-RDBMS", Database systems for advanced applications, vol. 3882, Lecture notes in Computer Science, Springer-Verlag, Jan. 1, 2006, 16 pages.

Hammerschmidt, B C et al., "Autonomous Index Optimization in XML Databases", $21^{st}$ International Conference on Data Engineering, XP010924124, IEEE, Apr. 5, 2005, 10 pages.

European Patent Office, "International Search Report", PCT/US2008/052932, dated Jun. 13, 2008, 13 pages.

Claims, PCT/US2008/052932, 4 pages.

Salminen, Ari et al., "Requirements for XML Document Database Systems" Dept. of Computer Science and Information Systems, University of Jwaskya, 2001, pp. 85-94.

Bohannon, Philip et al., From XML Schema to Relations: A Cost-Based Approach to XML Storage, Bell Laboratories, Proc of the $18^{th}$ International Conference on Data Engineering, IEEE, 2002, pp. 1-28.

U.S. Appl. No. 11/601,146, filed Nov. 17, 2006, Final Office Action, Mailing Date Dec. 5, 2011.

U.S. Appl. No. 11/601,146, filed Nov. 17, 2006, Office Action, Mailing Date Jul. 1, 2011.

U.S. Appl. No. 11/601,146, filed Nov. 17, 2006, Advisory Action, Mailing Date Feb. 22, 2012.

* cited by examiner

TECHNIQUES OF EFFICIENT QUERY OVER TEXT, IMAGE, AUDIO, VIDEO AND OTHER DOMAIN SPECIFIC DATA IN XML USING XML TABLE INDEX WITH INTEGRATION OF TEXT INDEX AND OTHER DOMAIN SPECIFIC INDEXES

This application is related to U.S. patent application Ser. No. 11/394,878, entitled "TECHNIQUES OF EFFICIENT XML META-DATA QUERY USING XML TABLE INDEX", filed by MURALIDHAR KRISHNAPRASAD et al. on Mar. 31, 2006, the entire contents of which is hereby incorporated by reference for all purposes as if fully set forth herein.

This application is related to U.S. patent application Ser. No. 11/601,146 entitled "TECHNIQUES OF EFFICIENT XML QUERY USING COMBINATION OF XML TABLE INDEX AND PATH/VALUE INDEX", filed on Nov. 17, 2006, the entire contents of which is hereby incorporated by reference for all purposes as if fully set forth herein.

FIELD OF THE INVENTION

The present invention relates to managing information and, more specifically, accessing information contained in XML documents that are stored in a database system.

BACKGROUND

Many database systems now support storage and querying of eXtensible Markup Language data ("XML data"). For example, a collection of XML documents can be stored in a shredded form in a database system. In this form, base structures in the database system can be defined in such a way as to capture hierarchical relationships among nodes in a XML document. Under an approach using the shredded form, when an XML document is submitted to the database system for storage, it is shredded into node values. The node values shredded are then stored in their respective columns in the base structures.

A disadvantage of this approach is that it requires a priori (e.g., prior to compilation of a query) knowledge about a XML schema that describes the collection of XML documents. If, however, the XML schema did not exist or were unknown, the database system would not be able to define properly a set of base structures that would reflect all data types and structural relationships the collection of XML documents may embody.

Even if the schema did exist and were known, still not all the data types or structural relationships in the collection of XML documents would be useful for many queries. For example, in cases where a user is only interested in a limited number of nodes in the collection of XML documents, a corresponding XML schema probably would define too many extraneous data types and too many complex, extraneous structural relationships about which very few queries care. In addition, shredding a collection of XML documents and storing resultant node values entails wasted efforts with little advantage in return.

Alternatively, the collection of XML documents may be stored in an aggregate form in a database system. In the aggregate form, XML documents are stored as CLOB (Character Large Object) or BLOB (Binary Large Object). This way, when storing XML documents, the database system does not have to shred them into node values. Also, under this aggregate approach, no prior knowledge of XML schema is required.

Alternatively, the collection of XML documents can also be stored in tree form in a database system.

However, a disadvantage of storing XML documents in the aggregate or tree form is that ad-hoc mechanisms may have to be used to satisfy XPath-based queries. In fact, without a suitable indexing mechanism on the collection of XML documents, in order to satisfy an XPath-based query, a database system has to perform a full scan of all XML documents. While a full scan of all XML documents could certainly be used to satisfy all XPath queries, in terms of processing time, the queries would be quite slow.

XML Table Indexes can speed up XPath types of queries. Under this approach, a query accesses an XML Table Index associated with a collection of XML documents, rather than the collection directly. Notably, an XML Table Index is logically a table, separate from the base structures storing the collection of XML documents, and indexes the collection of XML documents. The XML Table Index table includes a plurality of columns that corresponds to a plurality of nodes in the XML documents. Node values associated with the plurality of nodes are stored in the plurality of columns. Preferably, columns in the table of XML Table Index are ones commonly associated with XPath-based queries. That way, many if not all XPath-based queries can be answered by looking at values contained in the plurality of columns in the table of XML Table Index, instead of directly accessing the base structures that stores XML documents.

A disadvantage is that columns of complex data types are not handled in a useful way and queries involving relatively complex data types cannot be efficiently processed. For example, a collection of XML documents may involve nodes that store various XML embedded with domain specific data, such as text data, image data, audio data and other opaque data; merely storing raw values of those nodes are not useful because not many queries can be formulated in terms of raw values for complex data types.

Because of these limitations, the existing techniques are not as efficient in accessing XML documents in a database system as would be desired. As a result, a better mechanism that would improve accessing XML documents in a database system is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
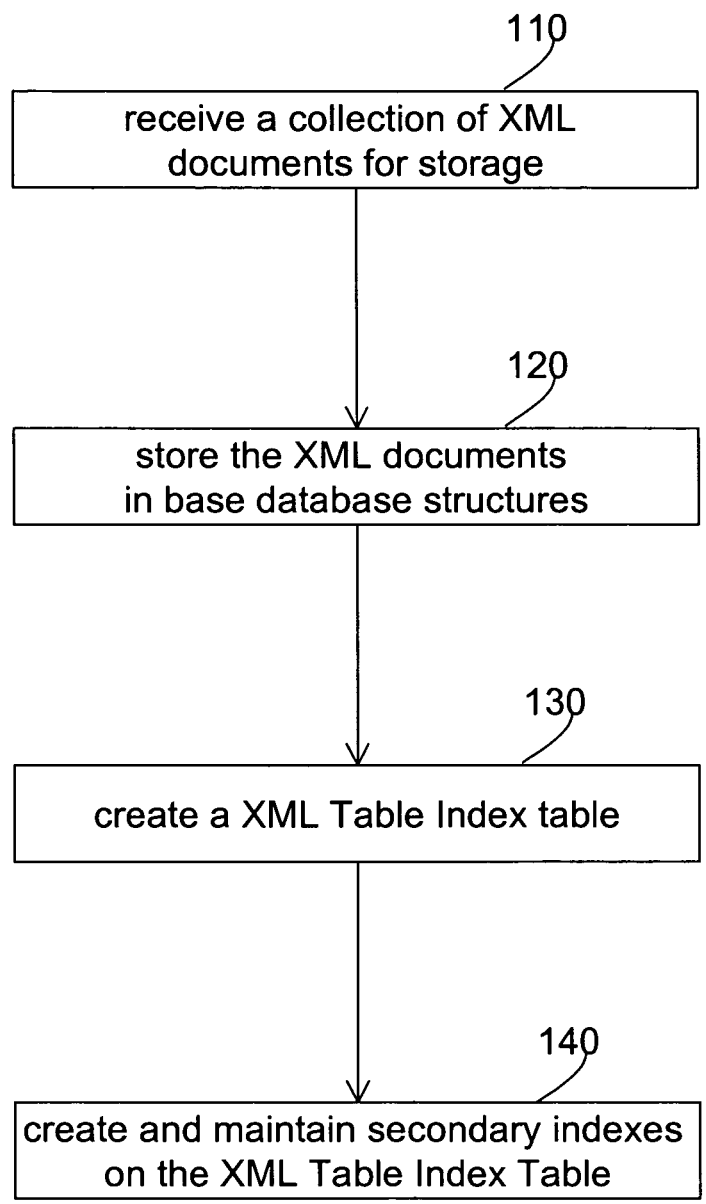
FIG. 1 is a flowchart illustrating a procedure for indexing a collection of XML documents using a XML Table Index and secondary indexes on columns of the XML Table Index in an embodiment.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Functional Overview

A mechanism is provided for indexing columns of complex data types in a XML Table Index using a domain index. As used herein, the term "complex data types" refers to types of XML data that have a number of domain-specific properties. Examples of such complex data types include, but are not limited to, various types of XML data such as text data, image data, sound data, or other opaque data embedded in XML documents for a given collection of XML documents. Data such as image data carries a number of domain-specific properties, for example, relating to image processing. Similarly, text data may carry a number of domain-specific properties. For example, the text data may carry some properties relating to language, region, or some keywords specifically contained in the collection of XML documents.

The mechanism in the present invention in various embodiments may be used regardless of formats and data structures used to store the actual XML data. For example, the actual XML data can reside in structures within or outside of a database, in any storable form, such as CLOB (character LOB storing the actual XML text), O—R (object relational structured form in the presence of an XML schema), or BLOB (binary LOB storing some binary form of the XML) or tree form.

The mechanism may also be used regardless of types of XML data stored in the columns in the XML Table Index. As noted before, types of XML data supported by various embodiments of the present invention include, but are not limited to, text data, image data, sound data or other opaque data, or a combination thereof.

In accordance with an embodiment of the present invention, the techniques described herein store XML nodes of complex data types as virtual columns in a XML Table Index. An XML document contains an information hierarchy of data items comprising elements and element attributes. For convenience of expression, as used herein, the term "node" refers to a data item (e.g., element, element attribute) of any particular type in the information hierarchy contained in an XML document.

The term "virtual column" refers to a column that does not store raw values of a XML node, but rather stores location information that the database system can use to map to the raw values of the XML node.

The use of a virtual column is optional. In one embodiment, raw values of an XML node of a complex data type may still be stored in the XML Table Index. However, by using virtual columns in place of raw values, the database system can avoid storing large amount of data redundantly in an index table like an XML Table Index table, thereby saving resources and efforts associated with storing, modifying and deleting raw values for complex data types. This does not create any disadvantage, because, as noted before, queries about complex data types are unlikely to be formulated in terms of raw values. Thus, this virtual column approach loses little practical advantage, if at all.

The techniques described herein also involve using a domain index. As used herein, the term "domain index" refers types of non B-tree based indexes that can be used in queries to locate domain-specific properties of a complex data type. For example, text data as a complex data type has many domain-specific properties. The text data may be written in certain language, and contains keywords which users may use to form bases of searches or lookups. An example of a domain index for the text data is Oracle Text Index, which the database system can create and maintain based on a linguistic analysis of a content of the text data. As used herein, the term "Oracle Text Index" refers to an index (of Context type) that is commercially available in Oracle database systems (e.g., Release 10 g) from Oracle Corporation, Redwood Shore, Calif. The Oracle Text Index provides users ability to perform a full text search on text data, structured or unstructured. A SQL function contains ( ) can be used in a "where" clause of a query to instruct a database system to locate domain-specific properties associated with the text data using the domain index (i.e., the Oracle Text Index) created and maintained based on the linguistic analysis. The Oracle Text Index thus created and maintained can be used for keyword searching, pattern matching, theme searching, etc.

Besides text data, another example of complex data types is image data. Image data may be embedded in XML documents using base64 encoding in one embodiment. Image data as a complex data type has many domain-specific properties such as height, width, (spatial) resolution, color depth, etc. The database system can create and maintain a domain index for the image data based on a metadata analysis of the image data. A SQL function resolution( ) can be used in a "where" clause of a query to instruct a database system to locate a domain-specific property (i.e. spatial resolution) associated with the image data using the domain index created and maintained based on the image metadata analysis. In one embodiment, this image-specific domain index thus created and maintained can similarly be used for querying properties relating to background, size or color, etc.

Queries against XML documents typically involve operations such as selection of relevant XML documents using predicates and (parent-child-descendent) navigation to nodes contained in selected XML documents. As shall be described in greater detail hereafter, by virtue of storing location information for complex data types and indexing relevant properties embedded in the collection of XML documents, this invention can be used to satisfy both these access operations effectively. In addition, depending on how embodiments of the domain index are implemented, use of the domain index may result in one or more of the following benefits: (1) Selection of relevant XML documents that match relevant properties can be efficiently made with a domain index if the relevant properties are captured in the domain index. For example, a domain index can narrow the selection to a small portion of the collection of XML documents, thereby obviating a need to perform a full scan against the entire collection of XML documents. (2) Prior knowledge of XML schema can be used by a domain index but is not required, as long as relevant properties to be included in the domain index are known. (3) XML documents can be flexibly stored in any desirable form. For example, XML documents can be stored in either aggregate form or a fully shredded form, or a form in between or a tree form. (4) Both information to be extracted and information to be matched can be stored in columns contained in a XML Table Index. With a domain index, both extracting and matching can be performed using the columns of XML Table Index, without directly accessing the collection of XML documents. Thus, query speed is improved. (5) Addition of new definitions, and deletion or modification of existing definitions that are unrelated to the properties captured by the domain index can be made to a XML Schema without adversely impacting either the XML Table Index or the domain index. (6) An unlimited number of data types can be supported by domain indexes. For example, in one embodiment, an applicant's contact information and picture can be placed in a single composite XML data type and stored in one column in a XML Table Index. A number of properties can be defined for a domain index. In the present example involving the applicant, a last name property, a first name property, and any number of image properties can be included in a domain index that corresponds to that column storing the single composite XML data type. Alternatively, the applicant's contact information and picture can be stored in two or more columns in a XML Table Index. For example, the applicant's last name property, first name property, and picture can be placed in two or more columns in the XML Table Index. Any number of image properties relating to the applicant's picture can be included in a domain index.

Example XML Document

For the purpose of explanation, examples shall be given hereafter with reference to the following XML document:

---
po.xml
---

```
<purchaseOrder>
    <reference>GHB3567</reference>
    <shipAddrCity>Oakland</shipAddrCity>
    <billAddrCity>Berkeley</billAddrCity>
    <lineItem itemNo = 34>
        <itemName>CPU</itemName>
        <itemQuantity>3</itemQuantity>
        <itemUnitPrice>123.45</itemUnitPrice>
        <ItemImage>
            <encoding>base64</encoding>
            <content>A12CFFF45678....</content>
        </ItemImage>
        <comment>
            This item I bought for my computer hardware
class at <b>Unversity of California</b> at Berkeley. I need
detailed receipt so that I can report for tax purpose.
        </comment>
    </lineItem>
    <lineItem itemNo = 68>
        <itemName>Memory</itemName>
        <itemQuantity>3</itemQuantity>
        <itemUnitPrice>23.45</itemUnitPrice>
```

---
-continued
---
po.xml
---

```
        <ItemImage>
            <encoding>base 64</encoding>
                <content>BEEE7890FBF....</content>
        </ItemImage>
        <comment>
            This item I bought for my home PC so that I can
work from home. I need detailed receipt so that I can
report to my employer <b>ORACLE</b> for reimbursement.
        </comment>
    </lineItem>
</purchaseOrder>
```

As used herein, po.xml is merely an example of an XML document. The techniques described herein are not limited to XML documents having any particular types, structure or content. Examples shall be given hereafter of how such documents would be indexed and accessed according to various embodiments of the invention.

XML Table Index With Virtual Columns

In one embodiment, a collection of XML documents (including po.xml) is stored in an aggregate storage. An XML Table Index is a table that is created to index the collection of XML documents. The XML Table Index projects out nodes from a collection of XML documents into columns. The collection of XML documents may remain in aggregate form, but with the creation of the XML Table Index, queries for frequently requested nodes can be run against the XML Table Index. The queries which access the XML Table Index can be more efficient than the queries which directly access the collection of XML documents.

For example, in a collection of XML documents that includes po.xml, nodes such as ItemNo, ItemName, ItemQuantity, ItemUnitPrice, ItemComment, ItemImage can be projected out into their respective columns in an XML Table Index ("PO_INDEX_TAB") as shown in Table 1. Among the nodes captured in PO_INDEX_TAB, ItemComment and ItemImage are columns that store values of complex data types. Specifically, ItemComment stores text data while ItemImage stores image data. Since the XML Table Index table is used to store rows extracted from a collection of XML documents, a DocId column is added to the PO_INDEX_TAB table to keep track of which XML document a particular row pertains to. Each document in the collection is assigned a unique value of DocId to distinguish it from the rest of the collection.

TABLE 1

| PO_INDEX_TAB | | | | | | |
|---|---|---|---|---|---|---|
| DocId | ItemNo | ItemName | ItemQuantity | ItemUnitPrice | ItemComment | ItemImage |
| Rid1 | 34 | CPU | 3 | 123.45 | Ptr_to_clob(34) | Ptr_to_blob(34) |
| Rid1 | 68 | Memory | 3 | 23.45 | Ptr_to_clob(68) | Ptr_to_blob(68) |
| Rid2 | ... | ... | ... | ... | | |

Furthermore, the columns in the XML Table Index are populated with node values extracted from po.xml as shown in Table 1. However, in cases where a column is of a complex data type, to save resources, in one embodiment, logical pointers to raw values of the node are stored in place of the raw values. For example, as shown in Table 1, ItemComment and ItemImage columns store logical pointers that respectively point to node values in po.xml. Specifically, Ptr_to_clob(34) points to a node value of a text data type, namely, "This item I bought for my computer hardware class at <b>Unversity of California</b> at Berkeley. I need detailed receipt so that I can report for tax purpose"; and Ptr_to_blob(34) points to a node value of an image data type, namely, "<encoding>base64</encoding><content> A12CFFF45678 . . . </content>". Likewise, Ptr_to_clob(68)

points to a node value of a text data type, namely, "This item I bought for my home PC so that I can work from home. I need detailed receipt so that I can report to my employer <b>ORACLE</b> for reimbursement"; and Ptr_to_blob(68) points to a node value of an image data type, namely, "<encoding>base64</encoding><content> BEEE7890FBF . . . </content>". For purpose of illustration, some blanks, newlines and dots have been removed from the above quotations.

Secondary Indexes

The XML Table Index table includes information of a number of nodes contained in the collection of XML documents that satisfy a wide range of queries. However, without secondary access structures, using the XML Table Index table to satisfy such queries will often require full scans of the XML Table Index table. Therefore, according to one embodiment, a variety of secondary indexes are created and maintained by the database system to accelerate the queries that perform selection based on (1) raw values and/or (2) domain-specific properties. The term "secondary index" refers to indexes on index tables, examples of the latter including XML Table Index and XML Path Index. For example, ordinary B-tree indexes can be created and maintained for columns of relatively simple data types. As used herein, the term "relatively simple data types" refers to data types that a query thereof can often be expressed in terms of (raw) values of the data types. On the other hand, domain indexes can be created and maintained based on domain-specific properties associated with columns of complex data types. This is so because the domain-specific properties, rather than raw values of the complex data types, are more commonly accessed in user queries.

For illustration, a regular B-tree index, i.e., PO_INDEX_ BTREE, can be built on two columns, namely, ItemQuantity and ItemUnitPrice, of the XML Table Index (PO_INDEX_TAB). Thus, entries in the PO_INDEX_BTREE are in the form (keyvalue, entryvalue), where keyvalue is a composite value representing a particular ItemQuantity/ItemUnitPrice combination, and entryvalue identifies a row or entry of the XML Table Index table.

When ItemQuantity and ItemUnitPrice are known, the PO_INDEX_BTREE may be used to quickly locate the corresponding rows within the XML Table Index table. For example, based on a key value "3/123.45", the PO_INDEX_ BTREE may be traversed to find the entry that is associated with the key value. Assuming that the XML Table Index table is populated as illustrated above, the index entry would have an entryvalue of 3/34, which points to a row in the XML Table Index table with a DocId "Rid1" and an ItemNo 34.

As this discussion demonstrates, this secondary index, i.e., PO_INDEX_BTREE, can be used by the database system to filter rows from the XML Table Index that matches specified predicates involving ItemQuantity and ItemUnitPrice columns, instead of performing a full scan on the XML Table Index.

For the purpose of illustration, a first domain index, i.e., PO_INDEX_DOMAIN_1, is created to index the ItemComment column of the XML Table Index (PO_INDEX_TAB). ItemComment stores text data. Thus, the first domain index can be maintained on this column in the form of an Oracle Text Index. As noted before, an Oracle Text Index provides users ability to perform a full text search on text data pointed (or mapped) to by the ItemComment column. In one embodiment, the Oracle Text Index comprises a first list of keywords that is contained in the text data, with each word in the first list of words being associated with the text data pointed to by a cell (within all cells of the ItemComment column) in which the each word appears.

Additionally, the Oracle Text Index may comprise a second list of words each of which has a synonymous word in the first list of words, with each word in the second list of words being associated with text data pointed to by a cell (within all cells of the ItemComment column) in which the synonymous word in the first list of words appears. In alternative embodiments, any of the first list of words and the second list of words each of which has a synonymous word in the first list of words may be stored outside the Oracle Text Index. In the alternative embodiments, the Oracle Text Index may be used to refer to those lists stored externally to accomplish the same text search functionality.

When a word is known, the PO_INDEX_DOMAIN_1 may be used to quickly locate the corresponding rows within the XML Table Index table. For example, based on a word "class", the PO_INDEX_DOMAIN_1 can be used to find which text data pointed to by a cell of ItemComment may contain the word "class". Assuming that the XML Table Index table is populated as illustrated above, the text data pointed to by an ItemComment cell "Ptr_to_clob(34)" would contain the word "class". Thus, the row containing this ItemComment entry ("Ptr_to_clob(34)") would be determined to be a match.

As noted before, text data is a type of domain-specific data that also permits search by synonymous words with Oracle Text Index. Therefore, when a word is known, the PO_INDEX_DOMAIN_1 may be used to quickly locate a cell in the ItemComment column that contains a synonymous word to the known word, thereby locating the corresponding row within the XML Table Index table. For example, based on the word "training", the PO_INDEX_DOMAIN_1 can be used to find which text data pointed by a cell of ItemComment may contain a synonymous word to the word "training". In one embodiment, synonymous words to any given word are set up either by (a) default (thesaurus) or by user configured synonymous word definitions. Assuming the word "class" is set up to be synonymous to the word "training" and assuming that the XML Table Index table is populated as illustrated above, the text data pointed to by an ItemComment cell "Ptr_to_clob(34)" would contain the synonymous word "class". Thus, the row containing this ItemComment entry ("Ptr_to_ clob(34)") would be determined to be a match.

As this discussion demonstrates, this secondary index, ie., PO_INDEX_DOMAIN_1, can be used by the database system to filter rows from the XML Table Index that matches specified predicates involving ItemComment column, instead of performing a full scan on the XML Table Index.

For the purpose of further illustration, a second domain index, i.e., PO_INDEX_DOMAIN_2, is created to index the ItemImage column of the XML Table Index (PO_INDEX_TAB). ItemImage stores image data. The second domain index can be maintained on this column based on image meta data such as height, width, (spatial) resolution, color depth, etc. The second domain index thus created and maintained provides a user ability to perform a search on image properties rather than raw values of the image data. In one embodiment, the PO_INDEX_DOMAIN_2 associates a resolution value of "high", "medium", or "low" with image data pointed to by cells in the ItemImage column. This association can be established based on the image metadata associated with the image data.

When a user queries for a row in the XML Table Index table containing an image with a specific image property such as resolution, the query can consult with the PO_INDEX_DO- MAIN_2. For example, based on a resolution value of "high", the PO_INDEX_DOMAIN_2 can be used to find which image data pointed to by a cell of ItemImage whose metadata indicates a high resolution image. Assuming that the XML Table Index table is populated as illustrated above, and assuming that image data pointed to by a cell "Ptr_to_blob (34)" does contain a high resolution image, the PO_INDEX_DOMAIN_2 can be used to determine that the image data pointed to is a match. Thus, the row containing this ItemImage cell ("Ptr_to_blob(34)") would be determined to be a match for the user query.

As this discussion demonstrates, this secondary index, ie., PO_INDEX_DOMAIN_2, can be used by the database system to filter rows from the XML Table Index that matches specified predicates involving ItemImage column, instead of performing a full scan on the XML Table Index.

Index Creation and Updates

FIG. 1 is a flowchart illustrating a procedure for indexing a collection of XML documents using a XML Table Index and secondary indexes on columns of the XML Table Index in an embodiment. At step 110, a user submits, and the database system receives, the collection of XML documents to be stored in a database system.

At step 120, the database system stores the collection of XML documents in one or more base database structures managed by the database system for storing the collection of XML documents. In one embodiment, what are actually stored in the base database structures are links to actual XML documents, rather than raw values (e.g., text strings in ASCII characters) of the actual XML documents.

Next, at step 130, the database system creates a XML Table Index table, which is separate from the one or more base database structures that store the collection of XML documents and stores a collection of entries in the table created. In one embodiment, the XML Table Index table could be created before the creation of the collection of entries by submitting a "CREATE TABLE" Data Definition Language (DDL) statement to the database system. In another embodiment, the XML Table Index table is created at the time when the collection of XML documents is processed. The XML Table Index table includes a plurality of columns, each of which is associated with one or more criteria. The one or more criteria are a path notation by which a node in a XML document can be identified. Each column in the plurality of columns stores values of an associated node (identified by the one or more criteria) in the collection of XML documents.

For the purpose of illustration, consider a collection of XML documents that comprises po.xml as shown before. In one embodiment, the collection of XML documents is stored in an aggregate form in a column "object_value" of a base database structure "PurchaseOrder". To generate the XML Table Index for the collection of XML documents, a "CREATE INDEX" DDL statement is executed. An example of such a statement is shown as follows:

---
CREATE INDEX Command
---
CREATE INDEX POIndex ON PurchaseOrder(object_value)
IndexType is XDB.XMLTableIndex
PARAMETERS('XMLTABLE PO_INDEX_TAB "//lineItem"
    Columns    ItemNo number path '@itemNo',
        ItemName varchar2(40) path 'itemName',
        ItemQuantity number path 'itemQuantity', ---
-continued CREATE INDEX Command
---
        ItemUnitPrice number path 'itemUnitPrice',
        ItemComment clob locator only path
'itemComment',
        ItemImage blob locator only path 'itemImage');

A "CREATE INDEX" statement creates an XML Table Index type index. In one embodiment, this index is represented by a table named in the statement. For example, the "CREATE INDEX" statement above creates an XML Table Index type index named "POIndex", which is internally a table named "PO_INDEX_TAB". In one embodiment, PO_INDEX_TAB is an object-relational table, which may be queried using object-relational techniques. In one embodiment, it has been determined that ItemNo, ItemName, ItemQuantity, ItemUnitPrice, ItemComment and ItemImage are nodes common to most PurchaseOrder queries. Accordingly, the XML Table Index is created with columns for each of those nodes. In alternative embodiments, a different set of nodes may be used to define the columns in the XML Table Index. The terms "clob locator only" and "blob locator only" indicate to the database system that virtual columns are to be created for ItemComment and ItemImage respectively.

When the statement is executed, the database system creates a table "PO_INDEX_TAB", as shown in Table 1, and populates it with values extracted from PurchaseOrder documents (including po.xml shown earlier).

At step 140, the database further creates and maintains one or more secondary indexes on the XML Table Index Table. In one embodiment, the one or more secondary indexes comprise at least one domain index for a column of a complex data type among the plurality of columns.

When a XML document is added to the collection of XML documents, the XML Table Index and its secondary indexes including B-tree indexes and domain indexes may be updated accordingly. For example, for the purpose of illustration, assume that po.xml is a new document to be added to the collection. Upon storing the new document into the base database structures, the database system extracts node values corresponding to the XML Table Index columns from po.xml and inserts rows for the extracted node values. For example, in the case of purcahseOrder.xml, two rows as shown in Table 1 would be inserted based on the node values extracted from the XML document. Furthermore, secondary indexes would be updated in a similar fashion, to take into account that new data has been received into the database system. Note that the storing of XML document, updating of the XML Table Index, or updating of the secondary indexes may be done at the same time, or in different times. For example, the updating of the secondary indexes may be delayed to a later time after a specified period or after a certain number of XML documents have been inserted into the database systems, rather than performed at the same time when an XML document is added to the database system.

When an XML document is removed from the collection of XML documents, the XML Table Index and its secondary indexes including B-tree indexes and domain indexes are updated accordingly. For example, for the purpose of illustration only, now assume that po.xml is removed from the database system. At the time of removing the XML document from the base database structures, the database system removes rows corresponding to the XML document from the XML Table Index table. For example, in the case of purchaseOrder.xml, two rows as shown in Table 1 would be removed. Furthermore, secondary indexes would be updated, to take into account that data has been removed from the database system. As noted before, the removing of a XML document, updating of the XML Table Index, or updating of the secondary indexes may be done at the same time, or at different times. For example, the updating of the secondary indexes may be delayed to a later time after a specified period or after a certain number of XML documents have been removed from the database systems.

In one embodiment, XML Table Index tables are created in a chained fashion to represent one or more hierarchical relationships in XML data. For example, a collection of XML documents stored in a database system may be indexed by a chain of XML Table Index tables each of which covers a separate group of nodes of the XML documents. In one embodiment, a single query plan may search multiple XML Table Index tables in the chain and return a single result set extracted from these XML Table Index tables.

Query Rewrite Leveraging Domain Index

After a domain index has been created and populated, it can be used to speed up queries involving an associated node of complex data type contained in the collection of XML documents. When a query is submitted on the collection of XML documents, the database system intercepts the query and determines whether the domain index can be leveraged to find results more quickly. For example, according to one embodiment, when a query, which involves a node of a complex data type, is submitted on a collection of XML documents, the database system first checks to see whether there is an existing XML Table Index for the collection of XML documents; if so, then checks to see whether the XML Table Index has a column corresponding to the node of complex data type; and if so, further checks to see whether the column has a domain index. If the column has a domain index, then the original query is internally rewritten to take advantage of the domain index. As mentioned above, creating the XML Table Index places commonly sought node values from the XML documents into a relational table. In one embodiment, the node values comprise complex data types such as text data, image data, audio data, etc. When a user queries for a node value of a complex data type, the database system first checks the XML Table Index to see if the node value is stored there before accessing the base database structures that store the collection of XML documents. For example, a typical search query on a collection of XML documents of resume types may include a request for a picture of every applicant. Assuming the XML Table Index has an image data column that stores applicants' pictures, the query is performed on the XML Table Index. In this way, in one embodiment, the request is answered without ever consulting the underlying base database structures that stores the collection of XML documents.

Furthermore, as mentioned above, a domain index can be created and maintained based on domain-specific data embedded in XML document. In one embodiment, the domain index indexes a complex data type such as text data, image data, audio data, etc. When a user queries for a node value of a complex data type, assuming the node value is stored in a column of the XML Table Index table, the database system checks to see if there is a domain index on the column, and if so, the index is used to find one or more cells in the column before scanning the column and before accessing the base database structures that store the collection of XML documents. For example, a typical search query on a collection of XML documents of resume types may include a request for a picture of "high" resolution. Assuming the XML Table Index has an image data column that stores applicants' pictures, and assuming there is a domain index that associates a "high" resolution value with one or more cells in the image data column, the query is performed using the domain index. Once the one or more cells in the image data column are identified using the domain index, the rows containing those cells are also identified. In this way, in one embodiment, the request is answered without ever scanning the XML Table Index table or consulting the underlying base database structures that stores the collection of XML documents.

Queries for less frequently sought after data may still make use of scanning the XML Table Index table, or simply perform full text searches on the base database structures. A simple illustration involves resumes submitted to a computer software manufacturer. Suppose a qualified applicant includes a personal statement on his resume. A personal statement is typically not required by a computer software manufacturer. So, when designing the XML Table Indexes, a column was not created for personal statements. However, at one point, the hiring manager decides she wants to search some buzzwords in personal statements. A query is made to find qualified individuals who have used those buzzwords in their resumes. In one embodiment, since a personal statement is a less frequently sought piece of data, it would not be found in the XML Table Index associated with the resumes. Note that since this query is performed infrequently, the overall performance of the database system is rarely impacted.

In one embodiment, the database system performs statistical analysis and/or keeps track of queries submitted to access nodes to determine if additional nodes or their values should be added or removed from the XML Table Index. For example, in the above scenario, assume that a personal statement becomes a standard part of queries used to access resumes. The database system detects that fact and, in one embodiment, automatically adds a column of a text data type to the XML Table Index to store personal statements in the resumes. Additionally, the database system detects that the buzzwords are used to query on personal statements and, in one embodiment, automatically creates a Oracle Text Index that associates the buzzwords with XML documents that those buzzwords appear in. Similarly, if at some point, personal statements may stop being queried values, the database system may automatically remove the Oracle Text Index created or remove that column from the XML Table Index.

Figure 2:
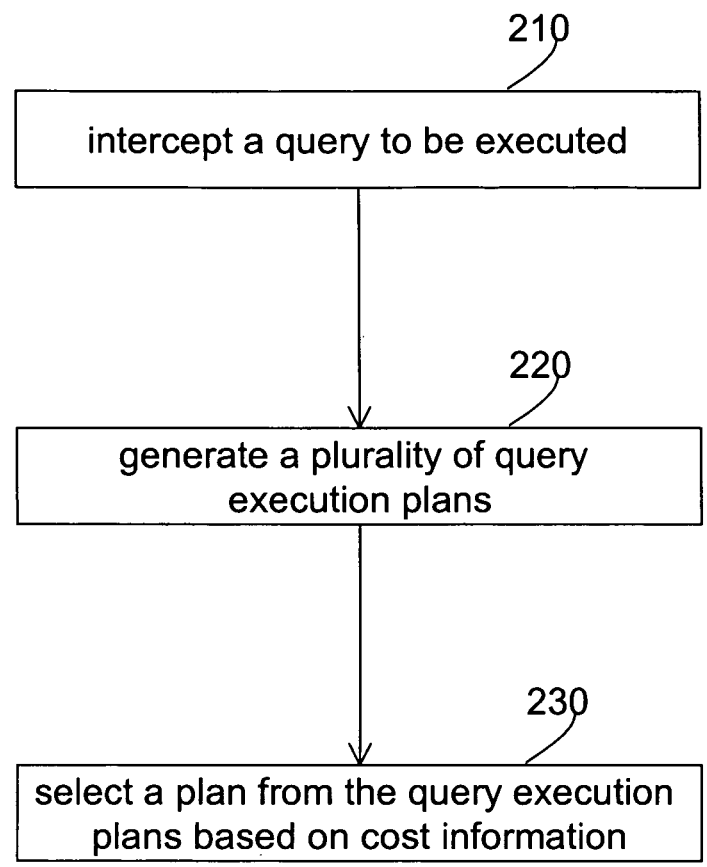
FIG. 2 is a flowchart illustrating how queries on the collection of XML documents can leverage domain indexes in an embodiment.

FIG. 2 is a flowchart illustrating how queries on the collection of XML documents can leverage domain indexes in an embodiment. At step 210, a user submits, and the database system intercepts, a query to be executed. An example of such a query is Q1 as follows:

| Q1 |
| --- |
| select extractValue(value(v), '/PurchaseOrder/reference')<br>from PurchaseOrder v<br>where existsnode(value(v), '//lineItems[itemUnitPrice > 20 and<br>    itemQuantity > 2 and ora:contains ("//comment", "class") and<br>    ora:resolution("//itemImage", "high")]') = 1; |

At step 220, a plurality of query execution plans are generated. As illustrated here, the query Q1 comprises predicates involving nodes contained in the XML documents. The nodes contained include two simple data types, namely, "itemUnitPrice" and "itemQuantity", and two complex data type, "comment" and "itemImage". If the XML Table Index only included simple data types but not complex data types such as virtual columns that stores values of the nodes "comment"

and "itemImage", the database system still would at least have two query execution plans. A first query execution plan wholly relies on XPath-based queries. Those XPath-based queries directly access the underlying XML documents stored in base database structures such as the PurchaseOrder table as indicated in Q1, and search each of the underlying XML documents for the fragments from the XML documents that satisfy the query predicates in Q1.

A second query execution plan would access the simple data types in the XML Table Index table, instead of performing XPath operations directly on the XML documents. However, since Q1 also contains a predicate for values of the node "comment" to contain a word "class", if the XML Table Index did not include a column that corresponds to "comment", the second query execution plan would be forced to access the underlying XML documents (via the base database structures that store them) to see whether any of the XML documents satisfy the predicates involving the word "class" and the resolution "high". Finally, the results from both XML Table Index table access and the base database structures would be merged to produce the final query result.

If the XML Table Index table has at least one secondary index, for example, on columns ItemUnitPrice and ItemQuantity, then the database system can also prepare a third query execution plan that makes use of the secondary index in selecting rows that match predicates involving ItemUnitPrice and ItemQuantity, thereby avoiding scanning the full XML Table Index table.

In one embodiment, assume that the XML Table Index (PO_INDEX_TAB) has been created for the collection of XML documents stored in the database system. The database system performs a check to see if the XML Table Index includes columns associated with the nodes being requested in the query. For example, in connection with Q1, the database system checks to see if PO_INDEX_TAB includes columns that can meet the conditions requested in the predicates, namely, whether the PO_INDEX_TAB includes ItemComment and ItemImage columns.

If PO_INDEX_TAB has columns ItemComment and ItemImage that correspond to the nodes "comment" and "itemImage" contained in the XML documents, then the database system can prepare a fourth query execution plan, which accesses only the XML Table Index table, i.e., PO_INDEX_TAB. In other words, there is no need to separately access the underlying XML documents stored in the base database structures or perform merger of results from multiple table accesses.

If it is determined that not only PO_INDEX_TAB contains the columns of complex data types associated with the predicates of the query, but also there is at least one domain index on the columns of complex data types, then the database system rewrites Q1 into a different query, Q2, as follows:

| Q2 |
|---|
| select v. reference<br>from PO_INDEX_TAB v<br>where v.itemUnitPrice > 20 and v.itemQuantity > 2 and<br>    contains(TO_CLOB(v.ItemComment), "class") and<br>    resolution(TO_BLOB(v.ItemImage), "high"); |

In the re-written query Q2, XPath query functions may be replaced by various filters in the SQL where clause. That is, an XPath query function operating on XML documents may be mapped to a second function operating on one or more columns in the plurality of columns in the XML Table Index table. For example, ora:contains( ) has been replaced by or mapped to, SQL contain( ) function, which suggests to a query plan generation logic of the database system that a domain index in the form of Oracle Text Index should be used in the predicate evaluation. Likewise, ora:resolution has been replaced by a SQL resolution( ) function, which suggests to the query plan generation logic that a domain index for image data should be used in the predicate evaluation. The functions "TO_CLOB" and "TO_BLOB" map the logical pointer values stored in the respective virtual columns to the actual fragments that contain raw values of the nodes represented by the virtual columns, it does not cost any runtime evaluation.

At step 230, the database system selects a plan from all available query execution plans based on cost information associated with each of the all available query execution plans. In one embodiment, the lowest cost plan is selected for execution.

Other Features of Domain Index

XML documents are often semi-structured, meaning two documents inserted in the same database may have different formats. In one embodiment, some XML documents use different terms to describe similar concepts. For instance, a PurchaseOrder document may use the node "comment" to identify the text data input and the node "itemImage" to identify the image data. Another document may use a different node name such as "note" and "item Diagram" to describe the same thing. In other words, the two or more nodes are logically the same, but have different names. When creating an XML Table Index and its columns of complex data types, in one embodiment, the database system provides a means to account for different terminology used from one document to the next.

In one embodiment, aliases are created for row patterns and column patterns that are logically the same. An alias maps multiple nodes into a single construct (for a column). The aliases themselves may be maintained globally or otherwise. In one embodiment, the internal structure of the XML Table Index remains the same when using aliases. For example, aliases can be used to indicate the logical equivalence of the "comment" to "note" or "itemImage" to "itemDiagram", etc.

For the purpose of illustration, examples have been made to associate a column in the XML Table Index table to one node in the collection of XML documents. The present invention is not so limited. In some embodiments, a column may map to two or more nodes in the collection of XML documents. For example, a single column "UserName" in a XML Table Index may contain the concatenation of text node values from two nodes "FirstName" and "Last Name".

Hardware Overview

Figure 3:
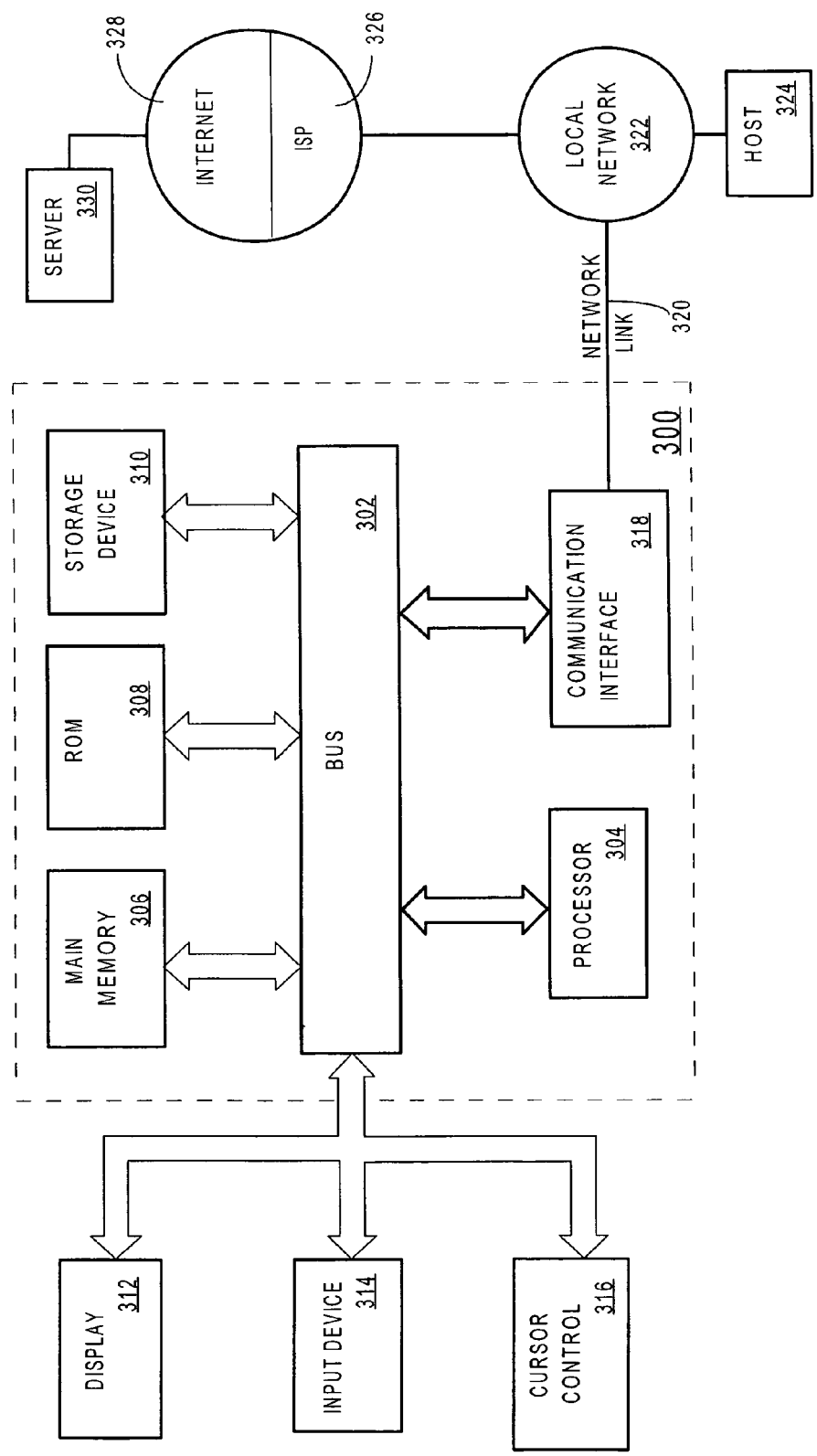
FIG. 3 is a block diagram of a system upon which the techniques described herein may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
   storing a collection of XML documents in one or more base database structures managed by a database system;
   creating a table, separate from the one or more base database structures, that indexes the collection of XML documents, wherein the table includes a plurality of columns, wherein each column is associated with one or more criteria and contains values of nodes that are in the collection of XML documents and that satisfy the one or more criteria; and maintaining a domain index on a first column of the plurality of columns;

wherein the domain index is not a B-tree index ordered according to values of nodes contained in the first column;

wherein the first column is of a complex data type; and wherein the method is implemented by one or more computing devices.

2. The method of claim 1, further comprising:
receiving a new XML document to store in the collection of XML documents;
extracting a new set of values from the new XML document, wherein each value in the set of new values corresponds to a node contained in the collection of XML documents;
populating each column of the plurality of columns from the table with the new set of values extracted from the new XML document; and
updating the domain index on the first column of the plurality of columns.

3. The method of claim 2, wherein the value of a node is XML meta-data.

4. The method of claim 2, wherein the value of a node is text data.

5. The method of claim 2, wherein the value of a node is image data.

6. The method of claim 2, wherein the value of a node is audio data.

7. The method of claim 2, wherein the value of a node is video data.

8. The method of claim 2, wherein the value of a node is an opaque data type data.

9. The method of claim 1, wherein the table is created by executing Data Definition Language instructions received from a user.

10. The method of claim 1, wherein the collection of XML documents is stored in an aggregate form.

11. The method of claim 1, wherein the collection of XML documents is stored in a shredded form.

12. The method of claim 1, wherein the collection of XML documents is stored in a tree form.

13. The method of claim 1, wherein a column from the plurality of columns maps to two or more nodes.

14. The method of claim 1, further comprising creating a secondary index for the table wherein the secondary index is not a domain index.

15. The method of claim 1, further comprising:
intercepting a query on the collection of XML documents; and
rewriting the query on the collection of XML documents to use the domain index.

16. The method of claim 15, further comprising:
analyzing the query to determine a frequently accessed node from the collection of XML documents; and
automatically adding a new column to the table for the frequently accessed node.

17. The method of claim 15, wherein rewriting the query includes mapping a first function operating on XML documents to a second function operating on one or more columns in the plurality of columns in the table.

18. The method of claim 1, wherein the table includes one or more references to a set of additional tables, and wherein the one or more references to the set of additional tables create a table chain.

19. The method of claim 1, wherein the first column of the plurality of columns is a virtual column.

20. A volatile or non-volatile computer-readable medium storing one or more sequences of instructions which, when executed by one or more processors, causes the one or more processors to perform:
storing a collection of XML documents in one or more base database structures managed by a database system;
creating a table, separate from the one or more base database structures, that indexes the collection of XML documents, wherein the table includes a plurality of columns, wherein each column is associated with one or more criteria and contains values of nodes that are in the collection of XML documents and that satisfy the one or more criteria; and
maintaining a domain index on a first column of the plurality of columns;
wherein the domain index is not a B-tree index ordered according to values of nodes contained in the first column;
wherein the first column is of a complex data type.

21. The volatile or non-volatile computer-readable medium of claim 20, wherein the one or more sequences of instructions further comprise instructions which, when executed by one or more processors, causes the one or more processors to perform:
receiving a new XML document to store in the collection of XML documents;
extracting a new set of values from the new XML document, wherein each value in the set of new values corresponds to a node contained in the collection of XML documents;
populating each column of the plurality of columns from the table with the new set of values extracted from the new XML document; and
updating the domain index on the first column of the plurality of columns.

22. The volatile or non-volatile computer-readable medium of claim 21, wherein the value of a node is XML meta-data.

23. The volatile or non-volatile computer-readable medium of claim 21, wherein the value of a node is text data.

24. The volatile or non-volatile computer-readable medium of claim 21, wherein the value of a node is image data.

25. The volatile or non-volatile computer-readable medium of claim 21, wherein the value of a node is audio data.

26. The volatile or non-volatile computer-readable medium of claim 21, wherein the value of a node is video data.

27. The volatile or non-volatile computer-readable medium of claim 21, wherein the value of a node is an opaque data type data.

28. The volatile or non-volatile computer-readable medium of claim 20, wherein the table is created by executing Data Definition Language instructions received from a user.

29. The volatile or non-volatile computer-readable medium of claim 20, wherein the collection of XML documents is stored in an aggregate form.

30. The volatile or non-volatile computer-readable medium of claim 20, wherein the collection of XML documents is stored in a shredded form.

31. The volatile or non-volatile computer-readable medium of claim 20, wherein the collection of XML documents is stored in a tree form.

32. The volatile or non-volatile computer-readable medium of claim 20, wherein a column from the plurality of columns maps to two or more nodes.

33. The volatile or non-volatile computer-readable medium of claim 20, further comprising creating a secondary index for the table wherein the secondary index is not a domain index.

34. The volatile or non-volatile computer-readable medium of claim 20, wherein the one or more sequences of instructions further comprise instructions which, when executed by one or more processors, causes the one or more processors to perform:

intercepting a query on the collection of XML documents; and rewriting the query on the collection of XML documents to use the domain index.

35. The volatile or non-volatile computer-readable medium of claim 34, wherein the one or more sequences of instructions further comprise instructions which, when executed by one or more processors, causes the one or more processors to perform: analyzing the query to determine a frequently accessed node from the collection of XML documents; and automatically adding a new column to the table for the frequently accessed node.

36. The volatile or non-volatile computer-readable medium of claim 34, wherein rewriting the query includes mapping a first function operating on XML documents to a second function operating on one or more columns in the plurality of columns in the table.

37. The volatile or non-volatile computer-readable medium of claim 20, wherein the table includes one or more references to a set of additional tables, and wherein the one or more references to the set of additional tables create a table chain.

38. The volatile or non-volatile computer-readable medium of claim 20, wherein the first column of the plurality of columns is a virtual column.

* * * * *

UNITED STATES PATENT AND TRADEMARK OFFICE
CERTIFICATE OF CORRECTION

PATENT NO. : 8,478,760 B2
APPLICATION NO. : 11/601147
DATED : July 2, 2013
INVENTOR(S) : Liu et al.

It is certified that error appears in the above-identified patent and that said Letters Patent is hereby corrected as shown below:

In the Specification

In column 5, line 34, delete "Unversity" and insert -- University --, therefor.

In column 6, line 63, delete "Unversity" and insert -- University --, therefor.

In column 9, line 62, delete "Tablelndex" and insert -- TableIndex --, therefor.

In column 10, line 44, delete "purcahseOrder.xml," and insert -- purchaseOrder.xml, --, therefor.

Signed and Sealed this
Twenty-second Day of October, 2013

Teresa Stanek Rea
*Deputy Director of the United States Patent and Trademark Office*